(12) United States Patent
Cavallo et al.

(10) Patent No.: US 7,696,665 B2
(45) Date of Patent: Apr. 13, 2010

(54) BRUSH HOLDER FOR AN ELECTRICAL COLLECTOR MACHINE, PARTICULARLY FOR A DIRECT CURRENT MOTOR

(75) Inventors: Paolo Cavallo, Asti (IT); Daniele Dal Colle, Asti (IT); Giuseppe Cavellini, Asti (IT)

(73) Assignee: Gate S.R.L., Turin (IT)

( * ) Notice: Subject to any disclaimer, the term of this patent is extended or adjusted under 35 U.S.C. 154(b) by 0 days.

(21) Appl. No.: 12/016,369

(22) Filed: Jan. 18, 2008

(65) Prior Publication Data

US 2008/0174201 A1 Jul. 24, 2008

(30) Foreign Application Priority Data

Jan. 24, 2007 (IT) .......................... TO2007A0048

(51) Int. Cl.
*H02K 13/00* (2006.01)
(52) U.S. Cl. ........................ 310/242; 310/248; 310/249; 310/251; 310/252
(58) Field of Classification Search .................... 310/43, 310/68, 71, 242, 248, 249, 251, 252
See application file for complete search history.

(56) References Cited

U.S. PATENT DOCUMENTS 3,405,317 A * 10/1968 Anderson .................... 361/41
5,039,898 A * 8/1991 Shiina ......................... 310/239
5,358,798 A * 10/1994 Kleinert et al. ................. 429/7
5,612,662 A   3/1997 Drekmeier et al.
6,404,093 B1 * 6/2002 Bastide et al. ............... 310/239
6,737,770 B2 * 5/2004 Sunaga et al. ............. 310/68 C
2006/0028315 A1   2/2006 Kawanishi

FOREIGN PATENT DOCUMENTS

| DE | 103 11 090 A1 | 9/2003 |
| EP | 0 982 749 A1 | 3/2000 |
| FR | 2 872 642 A1 | 1/2006 |
| FR | 2 876 513 A1 | 4/2006 |
| FR | 2899397 A1 * | 10/2007 |
| WO | 00/51223 A1 | 8/2000 |

* cited by examiner

*Primary Examiner*—Quyen Leung
*Assistant Examiner*—Jose A Gonzalez Quinones
(74) *Attorney, Agent, or Firm*—Sughrue Mion, PLLC

(57) ABSTRACT

A brush holder for a motor. The brush holder includes a plastic support structure corresponding incorporating at least a first and a second essentially rigid conducting element connected, respectively, between positive and negative brush or brushes and associated connecting members to form corresponding connecting paths in the brush holder for connecting the brushes to the terminals of an external source of supply voltage. At least one discontinuity is provided in at least one of the connecting paths. A resiliently deformable and electrically conducting strip is connected mechanically and electrically across this discontinuity, with a substantially permanent connection at one end, and with a thermally fusible connection at the other end, the strip having a resilient pre-loading which tends to break the connection at the said other end.

5 Claims, 5 Drawing Sheets

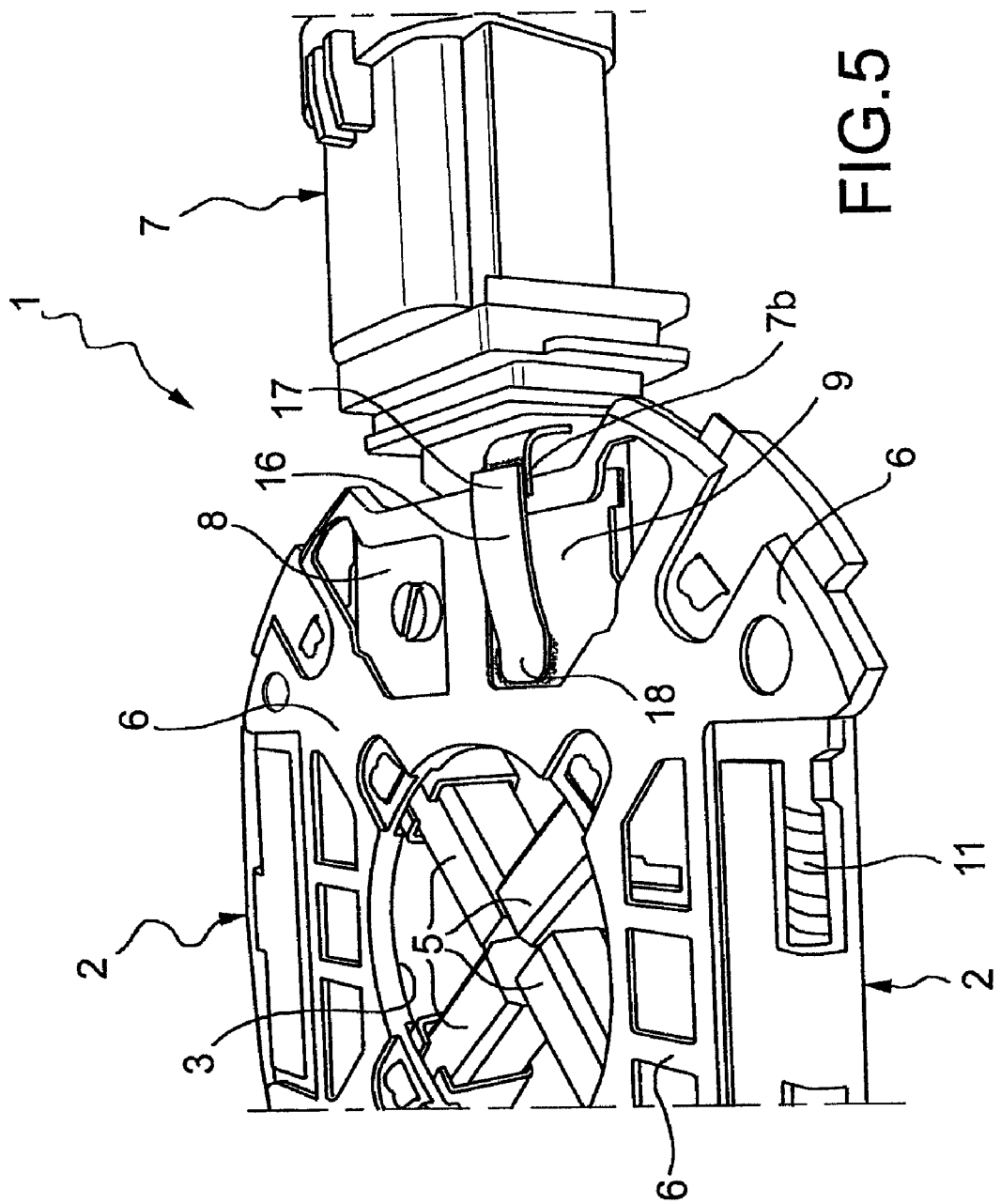

BRUSH HOLDER FOR AN ELECTRICAL COLLECTOR MACHINE, PARTICULARLY FOR A DIRECT CURRENT MOTOR

The present invention relates to a brush holder for an electrical collector machine, particularly for a direct current motor which can be used, for example, for rotating a fan.

More specifically, the invention relates to a brush holder of the type comprising an electrically insulating support structure having a central aperture for the passage of the collector, around which there are fixed retaining and guiding cases, with a positive or negative brush mounted translatably in each of these cases, one end of the brush bearing on the collector for operation;

the support structure comprising a body of moulded plastics material incorporating at least a first and a second essentially rigid conducting element, connected, respectively, between the positive and negative brush or brushes and associated connecting means, so as to form corresponding connecting paths in the brush holder for connecting the brushes, respectively, to the positive and negative terminals of an external source of supply voltage.

One object of the present invention is to provide a brush holder of the type specified above which can provide protection for the electrical machine against damage which may be caused by prolonged excess currents which may occur for any reason, for example as a result of the jamming of the rotor, excess voltages or excess loads, and which may lead to an anomalous rise in the temperature of the collector machine and its components.

This and other objects are achieved according to the invention with a brush holder of the type specified above, characterized in that at least one discontinuity is provided in at least one of the aforesaid connecting paths, a resiliently deformable and electrically conducting strip being connected mechanically and electrically across the said discontinuity, with a substantially permanent connection at one end, and with a thermally fusible connection at the other end, the strip also having a resilient pre-loading which tends to break the connection at the said other end.

In a brush holder according to the invention, the aforesaid thermally fusible connection is designed in such a way that it can break when its temperature exceeds a predetermined value for a specified period.

Further characteristics and advantages of the invention will be made clear by the following detailed description, provided purely by way of non-limiting example, with reference to the appended drawings, in which:

FIG. 5 is a partial perspective view from above of another brush holder according to the present invention.

Figure 1:
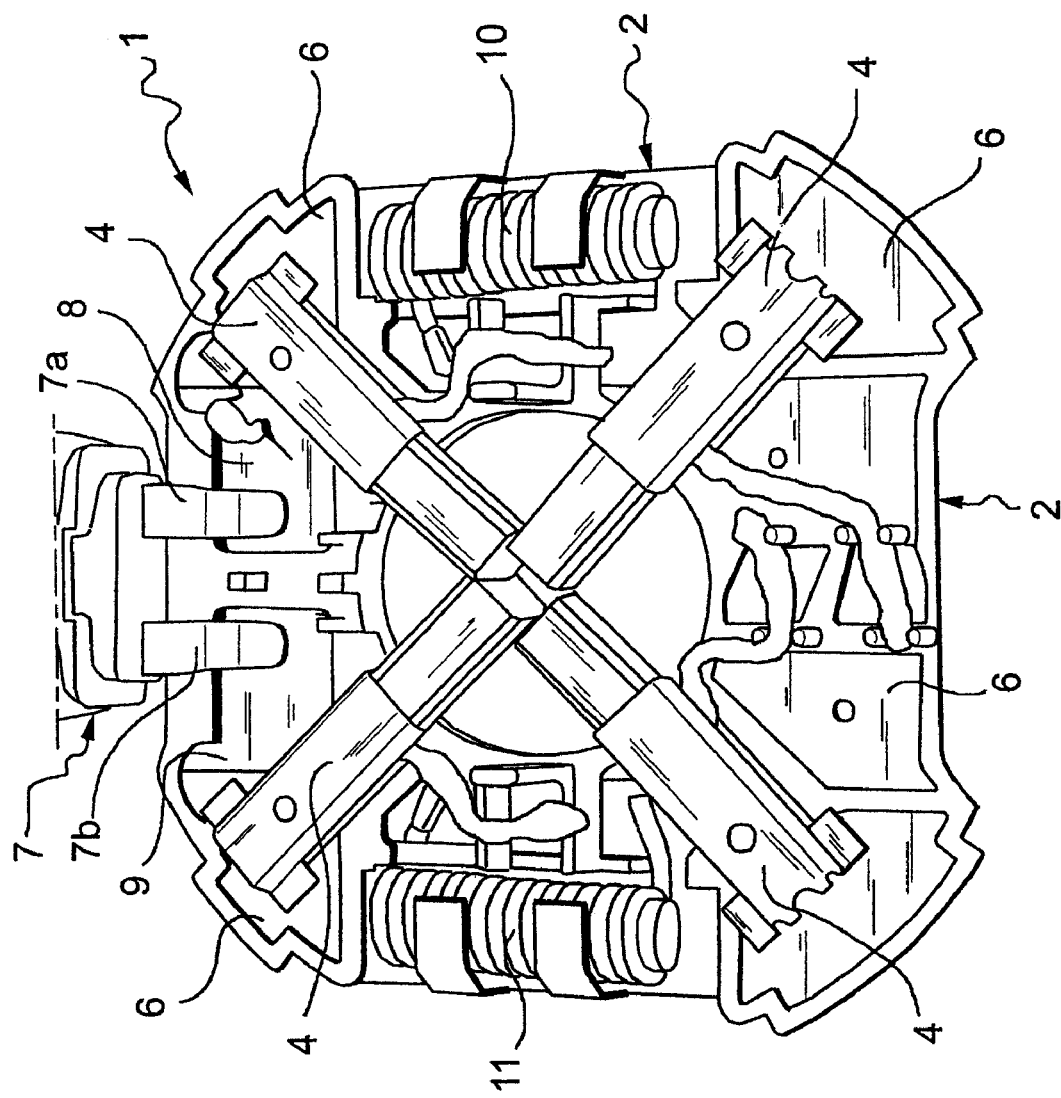
FIG. 1 is a partial view from above of a brush holder according to the present invention.
Figure 2:
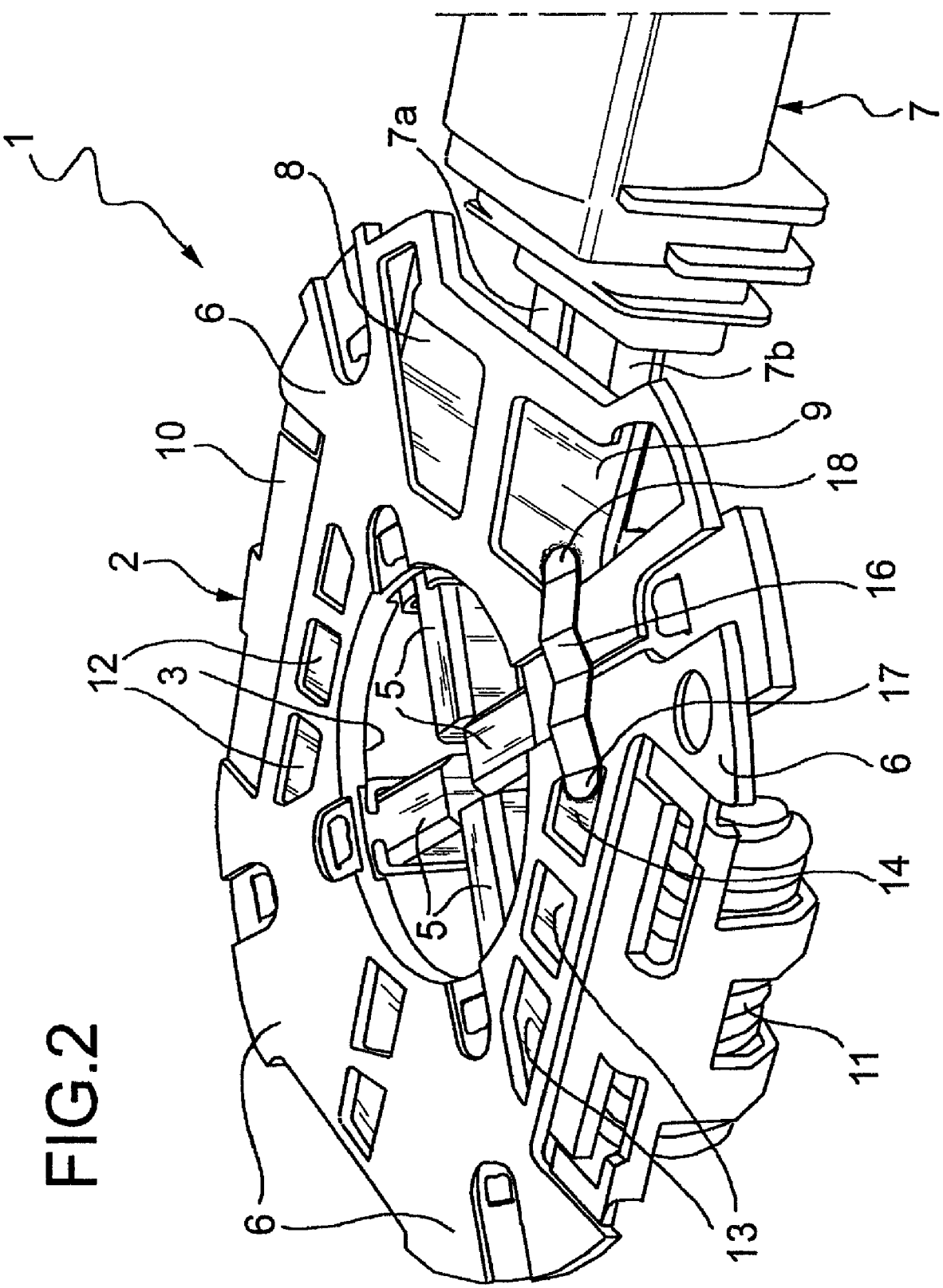
FIG. 2 is a perspective view from below of the brush holder according to FIG. 1.
Figure 4:
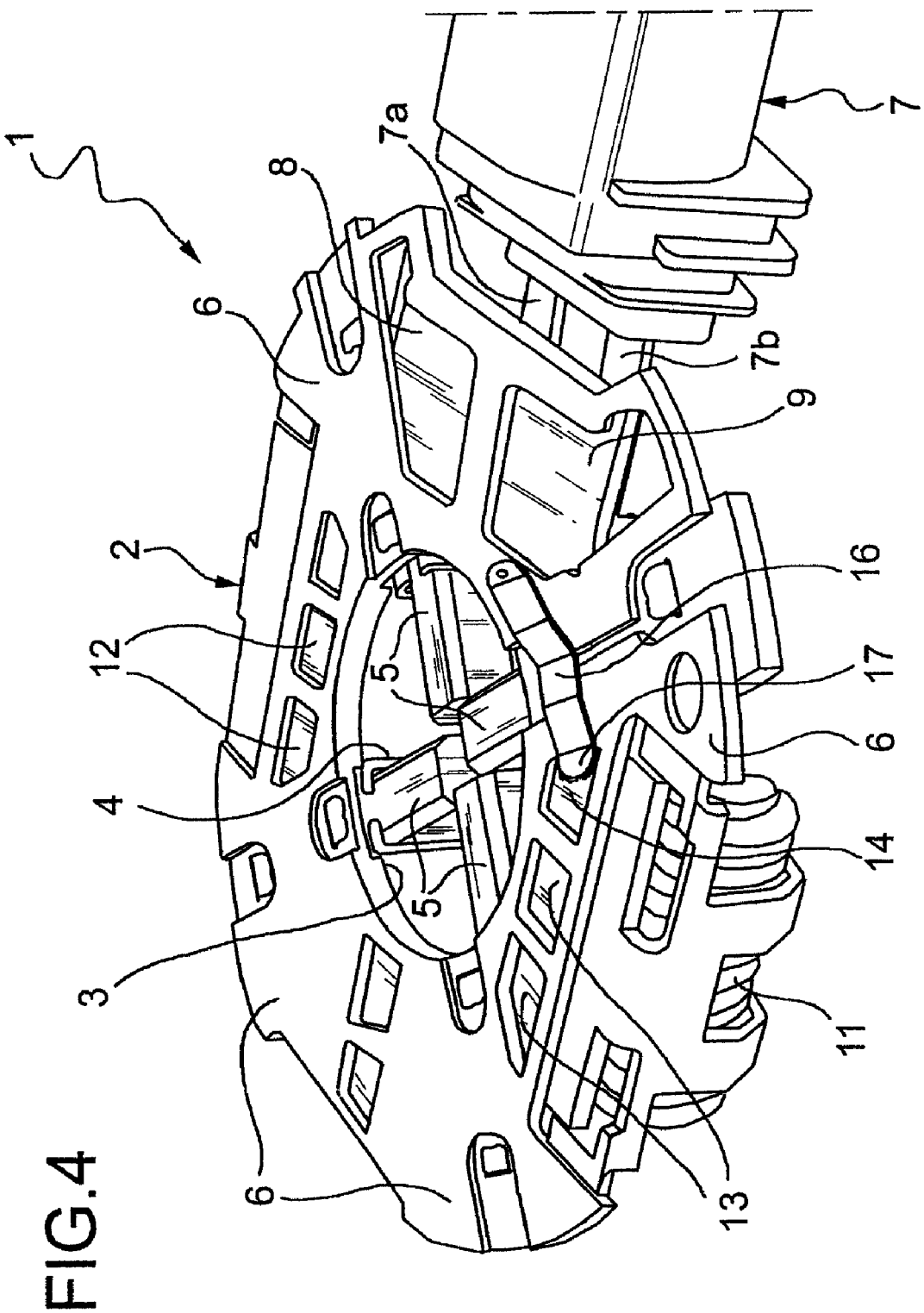
FIG. 4 is a perspective view from below, similar to that of FIG. 2, and shows a brush holder according to the invention in the condition in which the thermally fusible connection of a connecting strip has broken as a result of a rise in temperature.

With reference to the drawings, and to FIGS. 1, 2 and 4 in particular, in a first embodiment a brush holder 1 according to the invention for a collector machine, and particularly for a direct current electrical motor, comprises a support structure 2 of substantially annular shape.

This support structure has a central aperture 3 through which the collector of the electrical machine extends rotatably when the brush holder is installed for operation.

As shown in particular in FIG. 1, retaining and guiding cases 4 are fixed around the aperture 3 on one face of the support structure 2, a corresponding brush 5 being mounted in an axially translatable way in each of these cases.

Figure 3:
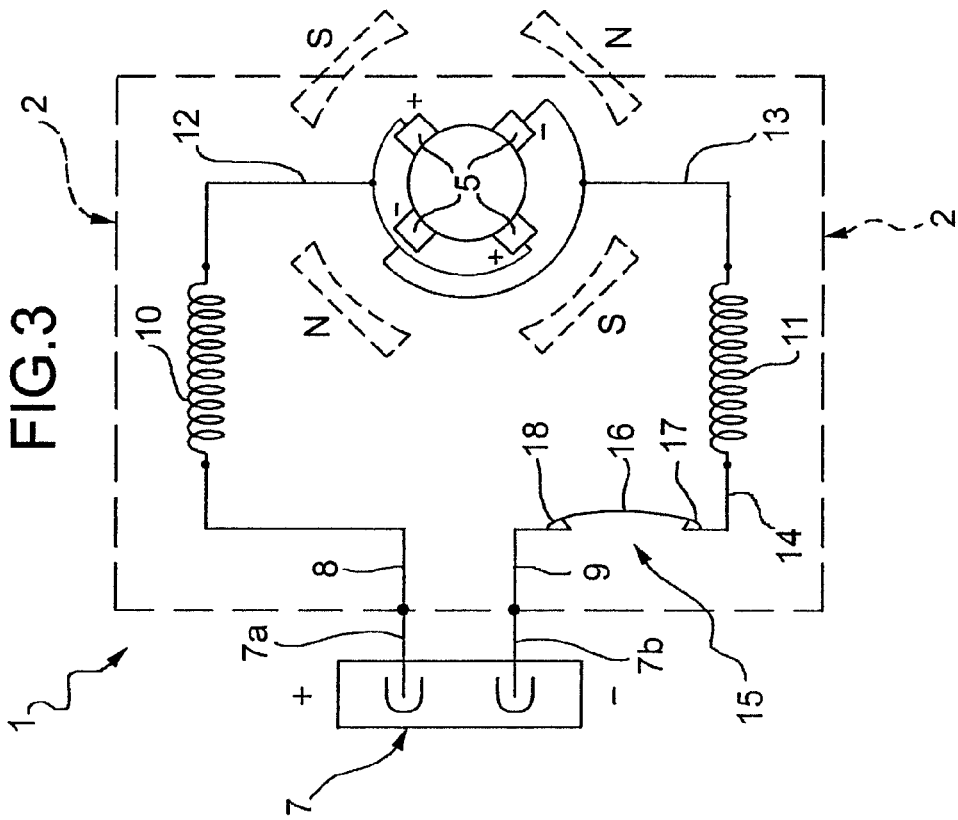
FIG. 3 is a schematic circuit diagram of the brush holder according to FIGS. 1 and 2.

In the embodiment illustrated by way of example, the brush holder 1 is intended for use in a four-pole electrical collector machine, and has two pairs of brushes, of which one is positive and one is negative, facing each other in pairs, as shown in the schematic diagram of FIG. 3 in which the positive brushes are identified by the sign "+" and the negative brushes are identified by the sign "−".

However, the invention is not limited to a brush holder with four brushes, but is also applicable to a brush holder having, for example, a single positive brush and a single negative brush.

In operation, the radially inner ends of the brushes 5 bear, in a known way, on the surface of the collector.

The support structure 2 essentially comprises a body 6 of moulded plastics material, the moulding of which incorporates essentially rigid conducting elements, connected between the positive and negative brushes 5 respectively, and associated connecting means, such as the terminals 7a and 7b of an electrical connector 7 intended to enable the brushes 5 to be connected, respectively, to the positive and negative terminals of an external source of supply voltage.

Alternatively, two insulated electrical conductors, also intended to enable the brushes to be connected to the terminals of an external voltage source, could be connected to the brush holder 1 in place of a connector.

In the example shown in FIGS. 1 to 4, the terminals 7a and 7b of the connector 7 are welded stably, in other words permanently, to portions of two conducting elements 8 and 9 left exposed by the overmoulded body of plastics material.

In the illustrated embodiment, the brush holder 1 also carries two induction coils 10 and 11, connected in series to the positive and negative brushes respectively, for attenuating radiated interference (see also FIG. 3).

In a corresponding way, further essentially rigid interconnecting conducting elements, indicated by 12, 13 and 14 in FIGS. 2 and 3, are incorporated in the body 6 of moulded plastics material.

Clearly, in a brush holder having a simpler structure, particularly one without the induction coils 10 and 11, it would be possible for the body of plastics material 6 to incorporate as few as two connecting conducting elements.

In combination, the conducting elements 8-14 form two connecting paths, for the positive brush or brushes and for the negative brush or brushes respectively.

With reference to FIGS. 1 to 4, a discontinuity, indicated by 15 in FIG. 3, is provided in one of these connecting paths. In the embodiment illustrated by way of example, this discontinuity is provided between the conducting elements 9 and 14 (which, incidentally, can be considered as two separate portions of the same conducting element), but could also be located elsewhere.

As shown in FIGS. 2 and 3, a resiliently deformable strip 16, made from an electrically conducting material, is connected mechanically and electrically across the discontinuity 15, with a substantially permanent connection 17 at one end, and with a thermally fusible connection 18 at its other end.

The connection 17 is made, for example, by electrically welding the ends of the strip 16 to the connecting conducting element 14.

The thermally fusible connection 18 is formed, for example, by soldering with a tin alloy for high temperatures, for example with a melting point of 300° C. The soldered end of the strip 16 can be conveniently provided with at least one through hole to provide a better "grip" for the tin alloy.

Conveniently, the strip 16 is fixed at its ends by the connections 17 and 18 in such a way that it is resiliently pre-loaded, particularly with a pre-load tending to break these connections, and in particular the thermally fusible connection 18.

The strip 16 can have a profile, in lateral view, having a "gull wing" shape, for example.

In operation, if there is a sudden increase in the current drawn by the electric motor with which the brush holder is associated, due for example to the jamming of the rotor, or to excess voltage or excess load, there will be a rapid rise in the temperature of the various components, including the conducting elements incorporated in the body 6 of the brush holder and the strip 16. If the temperature reaches and/or exceeds for a specified period the melting point of the thermally fusible connection 18, the corresponding end of the strip 16 is released from the conducting element 9 of the brush holder, and, because of its own resilient pre-load, moves away from it, thus instantaneously breaking the circuit, as shown in FIG. 4. Thus the motor is rapidly and effectively protected, and in particular the risk of development of flames is prevented.

Figure 6:
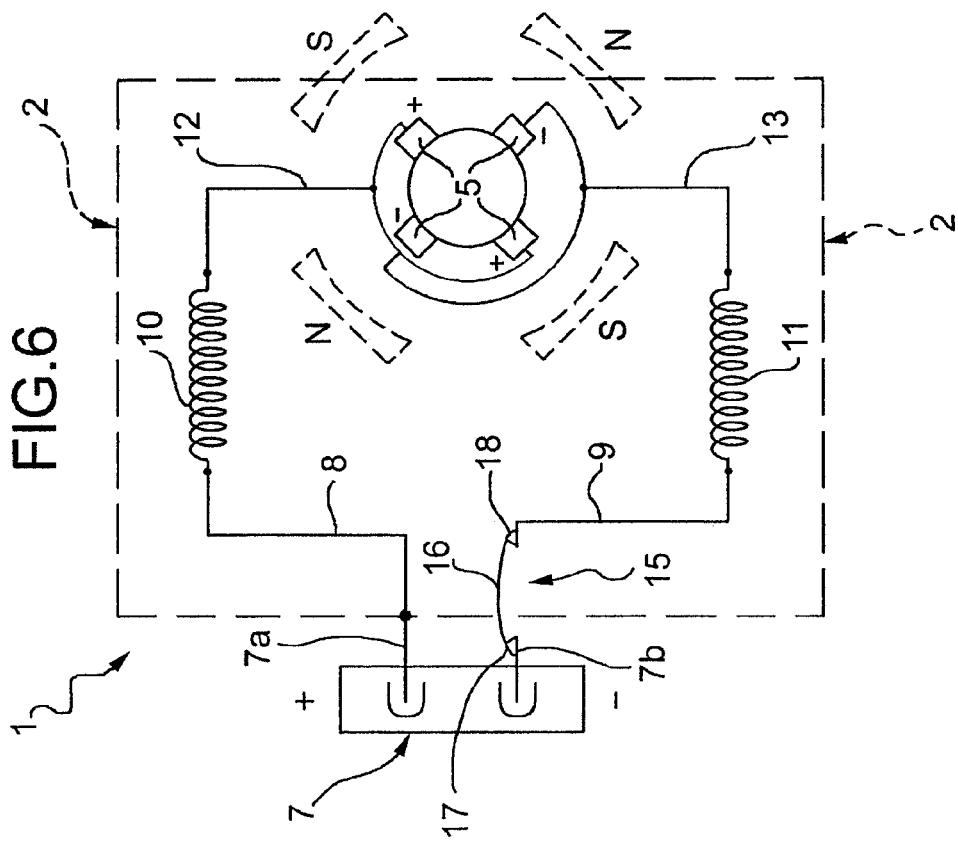
FIG. 6 is a schematic circuit diagram of the brush holder according to FIG. 5.

FIGS. 5 and 6 show a variant embodiment. In these figures, parts and elements described previously have been given the same reference numerals as those used previously.

The variant shown in FIGS. 5 and 6 differs from that described above essentially in that the discontinuity 15 in one of the two connecting paths between the brushes and the supply terminals 7a and 7b is located between one of these supply terminals (terminal 7b in the illustrated example) and the corresponding connecting conducting element 9 of the brush holder.

In this case also, a resiliently deformable and electrically conducting strip 16 is connected mechanically and electrically across the discontinuity 15, with a substantially permanent connection 17 at one end, for example the end nearer to the terminal of the connector 7, and with a thermally fusible connection 18 at the other end, for example the end nearer a corresponding connecting conducting element 9 of the brush holder.

The modes of operation of the variant shown in FIG. 6 are similar to those described previously with respect to the embodiment shown in FIGS. 1 to 4.

Clearly, provided that the principle of the invention is retained, the forms of application and the details of construction can be varied widely from what has been described and illustrated purely by way of example and without restrictive intent, without thereby departing from the scope of protection of the invention as defined by the attached claims.

What is claimed is:

1. Brush holder for an electrical collector machine, particularly for a direct current motor, comprising:

an electrically insulating support structure having a central aperture for the passage of the collector, around which retaining and guiding cases are fixed, a corresponding positive or negative brush being mounted in an axially translatable way in each of said cases, with one end of the brush bearing on the collector in operation;

the support structure comprising a body of moulded plastics material incorporating at least a first and a second essentially rigid conducting element connected, respectively, between the positive and negative brush or brushes and associated connecting means, so as to form corresponding connecting paths in the brush holder for connecting the brushes to the terminals of an external source of supply voltage;

at least one discontinuity being provided in at least one of the said connecting paths, a resiliently deformable and electrically conducting strip being connected mechanically and electrically across the said discontinuity, with a substantially permanent connection at one end, and with a thermally fusible connection at the other end, the strip also having a resilient pre-loading which tends to break the connection at the said other end, wherein the retaining and guiding cases extend transversely with respect to the axis of the central aperture of the electrically insulating support structure, and the positive and negative brushes are mounted in said cases for translation in respective directions transversely with respect to said axis and wherein the body of the support structure is overmoulded onto the first and second rigid conducting elements.

2. Brush holder according to claim 1, in which the said discontinuity is provided between two portions of one of the said connecting paths left exposed by the said body of moulded plastics material.

3. Brush holder according to claim 1, in which the said discontinuity is provided between an exposed portion of one of the said connecting paths and the associated connecting means.

4. Brush holder according to claim 1, in which the said substantially permanent connection of one end of the strip is an electrical weld.

5. Brush holder according to claim 1, in which the said thermally fusible connection of the other end of the strip is a tin alloy soldered joint.

* * * * *